United States Patent [19]

Norkey et al.

[11] Patent Number: 5,054,743
[45] Date of Patent: * Oct. 8, 1991

[54] FLUID CONNECTOR

[75] Inventors: Phillip J. Norkey, Jackson; David A. Bocson, Mt. Clemens, both of Mich.

[73] Assignee: U.S. Plastics Corporation, Madison Heights, Mich.

[*] Notice: The portion of the term of this patent subsequent to Jul. 11, 2006 has been disclaimed.

[21] Appl. No.: 521,391

[22] Filed: May 10, 1990

[51] Int. Cl.⁵ ............................................. F16L 37/40
[52] U.S. Cl. ................................ 251/149.6; 285/321; 285/921
[58] Field of Search ..................... 251/149.6; 285/321, 285/921

[56] References Cited

U.S. PATENT DOCUMENTS

| | | | |
|---|---|---|---|
| 3,567,175 | 3/1971 | Sciuto, Jr. | 251/149.6 |
| 4,601,497 | 7/1986 | Bartholomew | 285/921 X |
| 4,819,908 | 4/1989 | Norkey | 251/149.6 |
| 4,846,506 | 7/1989 | Bocson et al. | 285/921 X |
| 4,905,964 | 3/1990 | Shiozaki | 251/149.6 |
| 4,915,421 | 4/1990 | Dennany, Jr. | 284/921 X |
| 4,923,228 | 5/1990 | Laipply | 285/921 X |
| 4,943,091 | 7/1990 | Bartholomew | 285/921 X |

Primary Examiner—John Rivell
Attorney, Agent, or Firm—Lalos & Keegan

[57] ABSTRACT

A fluid connector generally comprising a housing having a longitudinal opening therethrough and at least one transverse opening therethrough intersecting with the longitudinal opening and providing at least one transversely disposed bearing surface, a conduit insertable in the longitudinal housing opening in a coupling position, the coupling having a fluid passageway communicating with the longitudinal housing opening and an annular flange spaced from the transverse bearing surface when the conduit is in the coupling position, means providing a seal between the housing and inserted conduit, a retainer disposed in the longitudinal housing opening including at least one leg section having a transversely deflectable retaining leg portion disposed between the annular flange portion of the conduit and the housing, the retaining leg portion having a pad portion engageable with the transverse bearing surface whereby upon application of fluid pressure to the connector tending to eject the conduit from the housing, the force exerted thereby is caused to be transmitted through the conduit annular flange, the retaining leg portion and the pad portion thereof to the housing and means for selectively deflecting the retainer leg portion transversely to permit the removal of the conduit from the housing.

20 Claims, 3 Drawing Sheets

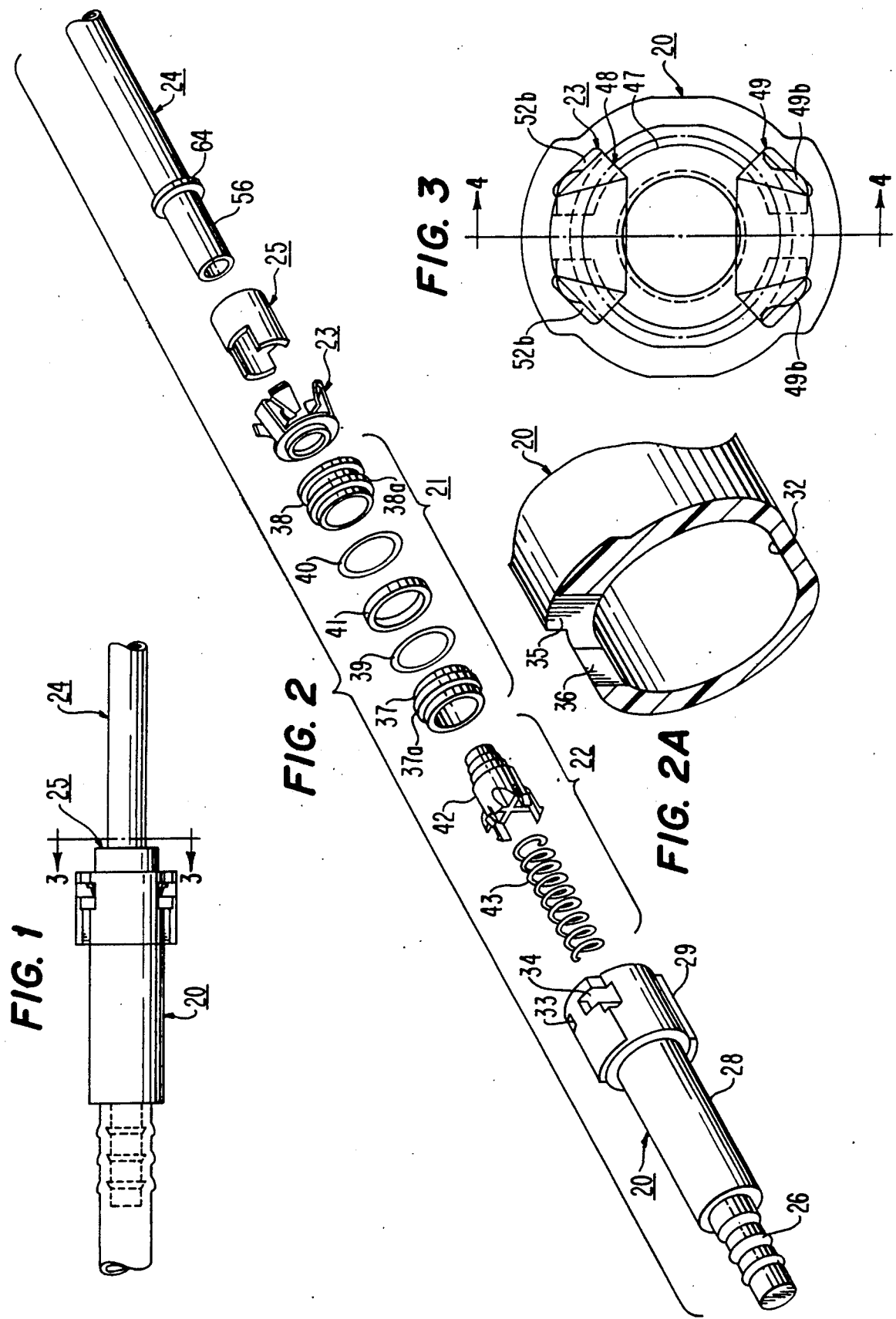

FLUID CONNECTOR

This invention relates to fluid connectors and more particularly to fluid connectors that are adapted to be quickly connected and disconnected. The invention further contemplates a fluid connector that is particularly suitable for use in automotive applications such as in fuel lines, air conditioning systems, power steering and brake systems.

In the prior art, there has been developed a type of quick connector that generally consists of a female housing, a male conduit insertable in the female housing in coupling relation therewith, sealing means disposed between the housing and the inserted conduit and means disposed in the housing for releasably retaining the conduit in coupling relation with the housing. Examples of such type of connector is illustrated and described in U.S. Pat. Nos. 4,819,908 and 4,846,506.

The male conduit member of such connectors typically is provided with an annular flange which is disposed within the female housing member when the members are disposed in coupling relation, and the retainer means typically is interposed between the conduit annular flange and a forwardly facing bearing surface on the housing, usually an annular shoulder. When fluid under pressure is applied to the connector in the coupled condition, tending to eject the male conduit member from the female housing, the force applied to the male conduit member is transmitted through the conduit annular flange and the retainer engaging the bearing surface on the housing, to the housing.

The materials from which the housing members of such connectors are formed usually depend on the pressure requirements of the connector applications. In lower pressure applications such as in automotive fuel line and air conditioning applications, operating in the range of 60 to 300 psi, plastic materials may be used for the housing members. In higher pressure applications such as automotive power steering and brake system applications, operating in the range of 1500 to 3000 psi, metal materials must be used for the housing members.

In the manufacture of such connectors, the general configuration of metal housing members may be readily formed by well-known methods on conventional production machinery and the bearing surfaces thereof engaged by the retainers may easily be formed by rolling the ends of the tubular housings radially inwardly to form annular lips providing a forwardly facing annular bearing surface. Such comparatively simple and inexpensive forming method is not suitable for use in forming plastic housing members, however, because although the general configuration of plastic housing members may be formed by injection molding, the resiliency of the material will not permit the ends of the housings to be rolled radially inwardly to form annular lips. The material will simply spring back and not retain a rolled over configuration as would metal. Accordingly, it has been found to be desirable to provide a fluid connector of the type described, having a plastic housing member that may be formed to provide one or more forwardly facing bearing surfaces that are adapted to be engaged by a retainer member for transmitting fluid pressures exerted on the male member through the retainer to the housing by a method other than rolling the housing end radially inwardly as is the practice in forming comparable housing members of metal.

Accordingly, it is the principal object of the present invention to provide an improved fluid connector.

Another object of the present invention is to provide an improved fluid connector that is adapted to be quickly connected and disconnected.

A further object of the present invention is to provide an improved fluid connector adapted to be quickly connected and disconnected which includes a plastic female member, a metal male member inserted in the female housing member in coupling relation and a metal retainer disposed within the housing member for retaining the male member in coupling relation with the female housing member.

A still further object of the present invention is to provide a fluid connector adapted to be quickly connected and disconnected and including a plastic female housing member having a forwardly facing bearing surface, a metallic male member insertable in the female housing member in coupling relation therewith and having an annular flange portion and a releasable retainer disposed within the housing member and interposed between the annular flange portion of the male member and the forwardly facing bearing surface of the female housing member in which the female housing member may be formed by a conventional, comparatively inexpensive manufacturing method.

Other objects and advantages of the present invention will become more apparent to those persons having ordinary skill in the art to which the present invention pertains from the following description taken in conjunction with the accompanying drawings wherein:

FIG. 1 is a side elevational view of an embodiment of the present invention;

FIG. 2 is a perspective view of the embodiment shown in FIG. 1, illustrating the components thereof in exploded relation;

FIG. 2a is an enlarged perspective view of the housing member of the embodiment shown in FIGS. 1 and 2, having portions thereof broken away to illustrate certain interior bearing and guide surfaces thereof;

FIG. 3 is an enlarged cross-sectional view taken along line 3—3 in FIG. 1;

Figure 4:
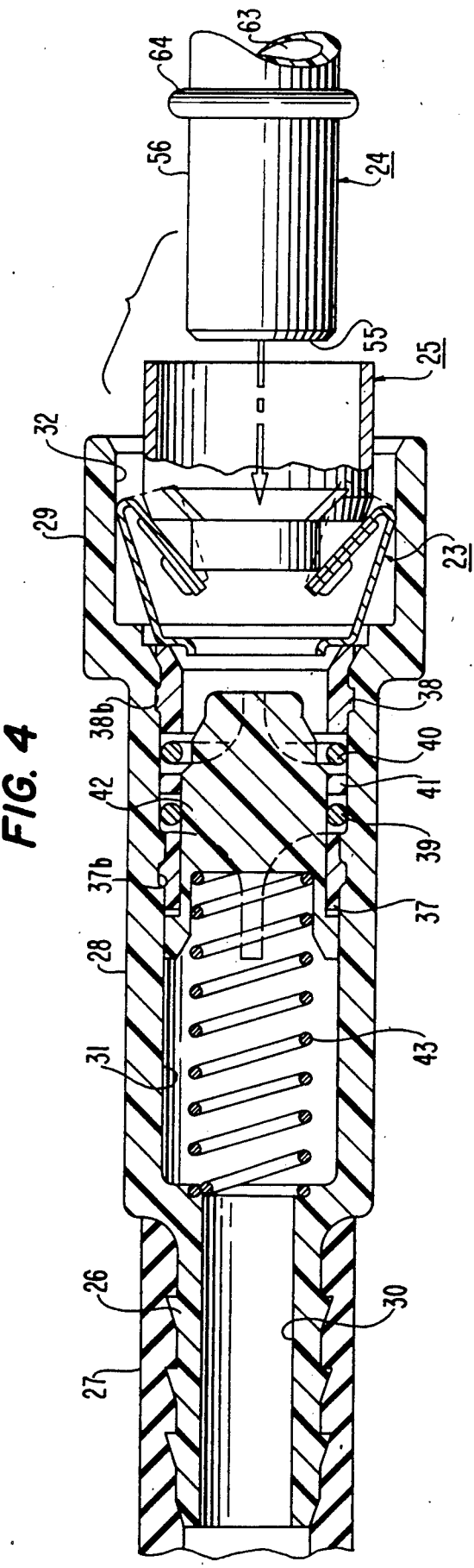
FIG. 4 is a cross-sectional view taken along line 4—4 in FIG. 3, illustrating a valve member thereof in a closed position and the female housing and male conduit members thereof in an uncoupled relationship.

Referring to the drawings, there is illustrated an embodiment of the invention which generally includes a female housing member 20, a sealing assembly 21 disposed in the housing member, a valve assembly 22 disposed in the housing assembly between the housing and the sealing assembly, a retainer member 23 disposed within the housing member, a male conduit member 24 insertable in the housing member in coupling relationship therewith and a release member 25 partially extending in the housing member and cooperable with the retainer member for releasing the conduit member from the housing member.

Figure 5:
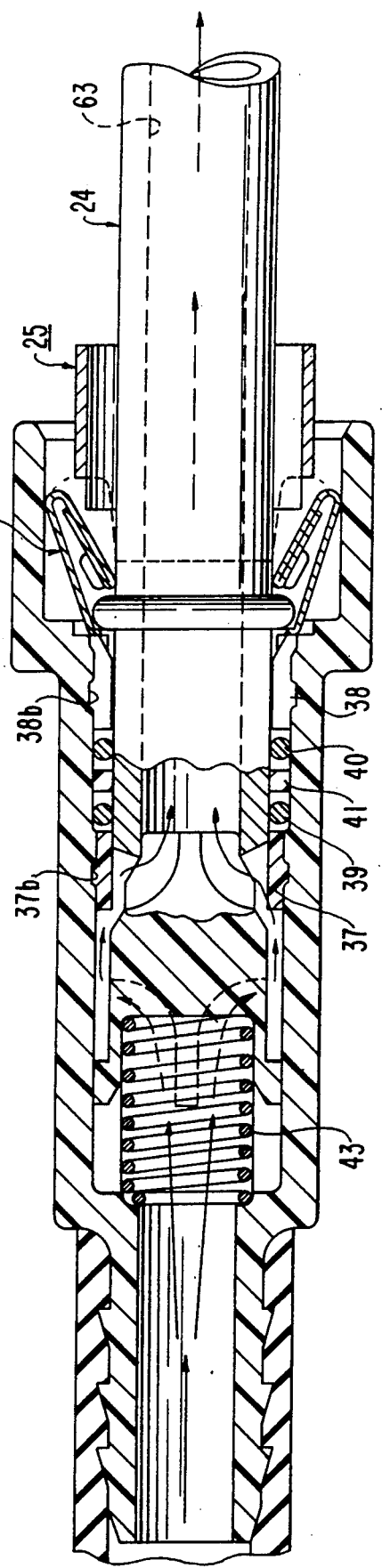
FIG. 5 is a view similar to the view shown in FIG. 4 illustrating the valve member in an open position and the female housing and male conduit members in coupling relationship.

As best shown in FIGS. 4 and 5, the housing member includes a reduced end section 26 adapted to be received within and secured to a flexible fluid line 27, an intermediate section 28 housing the valve and sealing assemblies and an enlarged end section 29 housing the retainer and release members. Internally, the housing member is provided with a longitudinal passageway 30 having a first enlarged section 31 having a substantially circular cross-sectional configuration and a second enlarged section 32 having a substantially oblong cross-sectional configuration. As best shown in FIGS. 1, 2 and 2a enlarged section 29 of the housing member is provided with a pair of transversely disposed slots 33 and 34 which are disposed on opposite sides of the longitudinal axis of the housing member, intersect enlarged section 32 and provide a first plurality of circumferentially spaced bearing surfaces 35 lying in a plane disposed perpendicular to the longitudinal axis of the housing member and a plurality of circumferentially spaced guide surfaces 36 disposed parallel to the longitudinal axis of the housing member.

The housing member may be formed by injection molding from any suitable material depending upon the use of the connector. For automotive fuel line applications, the material used should be highly heat resistant and highly chemical resistant. Preferably, for such uses, the housing member is formed of a polyphenol sulfide material manufactured by the Phillips 66 Company of Bartlesville, Oklahoma and sold under the trademark RYTON.

Sealing assembly 21 includes a pair of spaced bushings 37 and 38, a pair of O-rings 39 and 40 disposed between the bushings and a spacer 41 disposed between the O-rings. The bushings are provided with annular projecting portions 37a and 38a which are adapted to be snap-fit into complementary annular grooves 37b and 38b formed in the wall of enlarged section 31 of the housing passageway to fix the bushings relative to the housing member and cause them to function as integral components of the housing member. The O-rings are disposed between the bushing members and are separated by the spacer 41. Preferably, the bushings and the spacer are formed of nylon. The material of the O-rings would depend on the nature of the system medium. For fuel line applications materials consisting of a fluorocarbon/fluorosilicone blend can be used.

Figure 9:
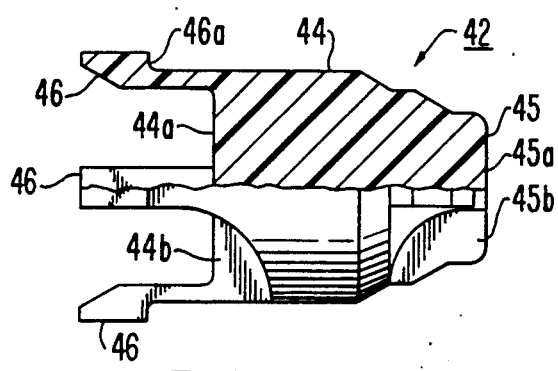
FIG. 9 is a side elevational view of the valve member shown in FIGS. 2, 4 and 5, having a portion thereof broken away.
Figure 10:
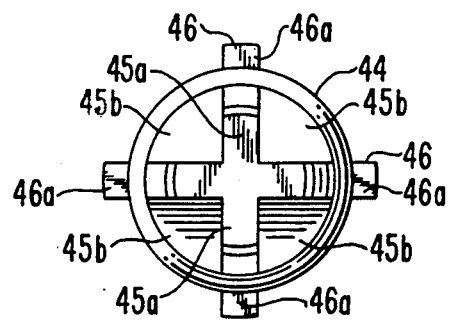
FIG. 10 is a front elevational view of the valve member shown in FIG. 9.

Valve assembly 22 consists of a valve member 42 and a spring 43. As best seen in FIGS. 9 and 10, the valve member includes a cylindrical main body portion 44 having diameter slightly less than the inside diameter of bushings 37 and 38 and spacer 40 to allow the valve member to be received and guided by bushing 37 into sealing engagement with 0-ring 39 to provide fluid tight seal between the valve member and the housing member as shown in FIG. 4, a reduced nose portion 45 and a set of longitudinally extending, circumferentially spaced leg portions 46. Rear end face 45a of reduced nose portion as is provided with circumferentially spaced cut out portions 45b which serve as fluid passageways when the valve member is in an open position as illustrated in FIG. 5. Similarly, front end face 44a of cylindrical body portion 44 is provided with circumferentially spaced cut outs 44b which also serve as fluid passageways when the valve member is in the open position as shown in FIG. 5.

The rearward axial displacement of the valve member is restricted by the engagement of rearwardly facing surfaces 46a of the leg portions of the valve member which are adapted to engage bushing 37. The valve member is biased in the closed position as shown in FIG. 4 by spring 43 interposed between an annular seat provided on the housing member and forwardly facing end surface 44a of the valve member. Preferably, the valve member is formed of a nylon material and the spring is formed of stainless steel.

Figure 6:
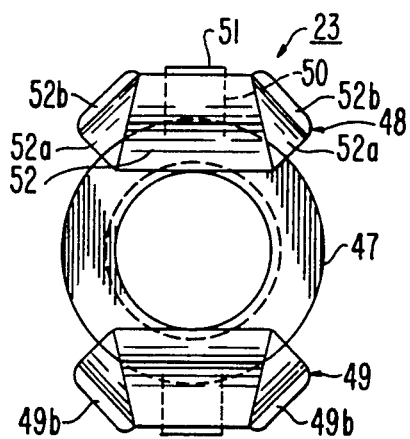
FIG. 6 is a rear elevational view of the retainer member shown in FIGS. 3 through 5.
Figure 7:
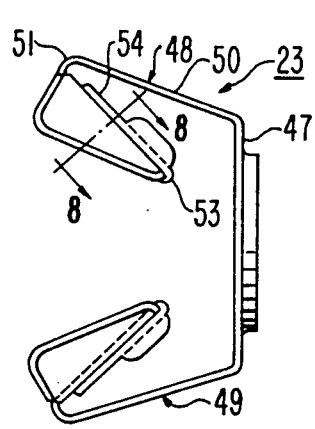
FIG. 7 is a side elevational view of the retainer member shown in FIG. 6.
Figure 8:
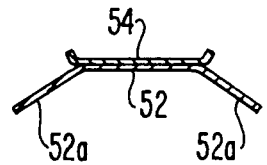
FIG. 8 is a cross-sectional view taken along line 8—8 in FIG. 7.

FIGS. 6 through 8 best illustrate the retainer member which includes an annular section 47 and a pair of identical leg sections 48 and 49. Annular section 47 has an outer diameter sufficient to enable the retainer member to engage the rear end of bushing 38 as shown in FIGS. 4 and 5 and an inner diameter sufficient to permit leading end portion 56 of the conduit member to be received therethrough as shown in FIG. 5. Leg section 48 includes support leg portion 50 extending axially and radially relative to the longitudinal axis of annular section 47 from the annular section and terminating in a first reverse bend 51, a deflectable retaining leg portion 52 radially and axially from first reverse bend 51 toward the opening in the annular section and terminating in a second reverse bend 53, and a fold-back portion 54. Retaining leg portion 52 is provided with laterally projecting wing portions 52a which in turn are provided with pad portions 52b formed along the rear edges thereof. Pad portions 52b of leg section 48 and similar pad sections 49b of leg section 49 are circumferentially spaced relative to the longitudinal axis of annular section 47 and ar adapted to engage circumferentially spaced transverse bearing surfaces 35 formed by transverse slots 33 and 34 when the retainer member is disposed in enlarged section 32 of the housing member as shown in FIGS. 4 and 5. Typically, the retainer members are formed by stamping suitably configured blanks from metal sheet materials and bending the blanks to form the leg sections as described. Preferably, and particularly for applications where the fluid with which the connector is used is corrosive, the retainer members are formed of stainless steel.

Conduit member 24 is tubular providing a fluid passageway 63. It includes an annular flange portion 64 spaced from a leading end 55 thereof and a leading end portion 56 disposed between the leading end thereof and annular flange portion 64. As best shown in FIG. 5, leading end portion 56 has an outside diameter substantially equal to the outside diameter of the valve member so that when the leading end portion of the conduit member is fully inserted into the housing so that annular flange portion 64 thereof engages annular section 47 of the retainer member, the valve member will be displaced forwardly against the biasing action of spring 43 to an open position and conduit leading end portion 56 will be received within bushings 37 and 38, in sealing engagement with O-rings 39 and 40 to provide a fluid tight seal between the conduit and housing members.

As the conduit member is inserted into the housing member in such manner, the engagement of the annular flange portion 54 of the conduit member will cam the retainer leg portions of the retainer member radially outwardly to permit the annular flange portion to displace past the retaining leg portions of the retainer into engagement with the annular section of the retainer member. Once the annular flange portion advances beyond the retainer leg portions of the retainer member, the retainer leg portions snap back radially inwardly behind the annular flange portion of the conduit member to obstruct the rearward displacement of the conduit member and secure the conduit member in coupling relationship with the housing member as shown in FIG. 5. The conduit member may be formed from any suitable metal or plastic material having sufficient strength characteristics and the annular flange portion of the conduit similarly may be formed by any suitable method.

Figure 11:
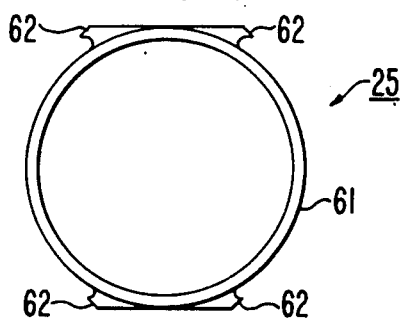
FIG. 11 is a rear elevational view of the release member shown in FIGS. 2, 4 and 5.
Figure 12:
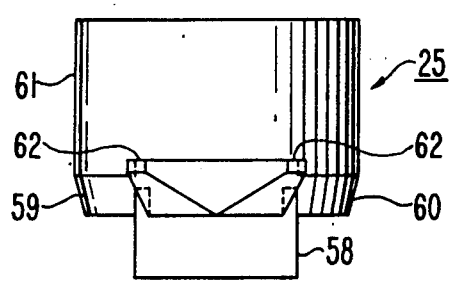
FIG. 12 is a side view of the release member.
Figure 13:
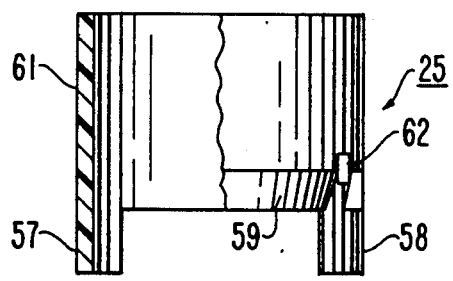
FIG. 13 is a top view of the release member having a portion thereof broken away.

Referring to FIGS. 11 through 13, release member 25 consists of a short tubular member having a pair of forwardly projecting sections 57 and 58 and upper and lower, beveled cam surfaces 59 and 60. The outside diameter of tubular member 61 is less than the transverse dimension or minor diameter of oblong enlarged section 32 to permit the insertion of the release member into enlarged section 32 of the housing, and the inside diameter of tubular member 61 is sufficiently large to permit the passage of the conduit member with annular flange portion 54 therethrough when the release member is mounted in enlarged section 32 of the housing member as shown in FIGS. 4 and 5.

As best shown in FIGS. 4 and 5, cam surfaces 59 and 60 are longitudinally aligned with the retaining leg portions of leg sections 48 and 49 of the retainer member so that when the release member inserted in enlarged section 32 of the housing member as shown in FIGS. 4 and 5 is displaced forwardly into engagement with the retaining leg portions of the retainer member, the retaining leg portions will be caused to deflect radially outwardly to permit the passage of the annular flange portion of the conduit member past the retaining leg portions of the retainer member and thus permit the removal of the conduit member from the housing member. Excessive deflection of the retaining leg portions is prevented by the engagement of extending sections 57 and 58 with the annular section of the retainer member thus limiting the forward displacement of cam surfaces 59 and 60 in contact with the retaining leg portions.

The release member is maintained within enlarged section 32 of the housing member and in a proper orientation, and is guided in axial displacement by means of a set of deflectable tabs 62 spaced circumferentially on tubular member 61 of the retainer member at the junctures of forwardly extending arm sections 57 and 58 and cam surfaces 59 and 60. The tab portions are adapted to engage longitudinal surfaces 36 of transverse openings 33 and 34 in the housing member to guide the axial displacement of the release member and prevent its rotation resulting in a misalignment of cam surfaces 59 and 60 with the retaining leg portions of the retainer member. Such tabs further are engageable with transverse bearing surfaces 35 to prevent the removal of the release member from the housing member. The tabs also are engageable with front faces of transverse slots 33 and 34 to further restrict the forward displacement of the release member.

Although the outside diameter of the release member is only slightly less than the transverse dimension or minor diameter of the oblong enlarged section 32 resulting in an interference between the lateral projections of the tab elements and the housing member, such tabs are formed of a material allowing them to flex as the release member is inserted into the housing until the tabs enter the spaces provided by transverse openings 33 and 34 where they flex back to their original extended positions in contact with guide surfaces 36 and engageable with transverse bearing surfaces 35 preventing the withdrawal of release member from the housing member. Preferably, the release member is formed of nylon or a similar material which provides it with sufficient rigidity yet permits tabs 62 to flex to permit the insertion of the release member into the housing member.

The connector as described is assembled by first inserting the valve and sealing assemblies mounted on a tool as a single assembly in the enlarged end of the housing member until bushings 37 and 38 are snapped into position in annular grooves 37 and 38. The retainer member is then positioned in enlarged section 32 so that the annular section thereof engages or is seated on bushing 38. The release member is then inserted into the housing member until the deflected tabs clear the interior wall of enlarged section 32 and deflect back to their projecting positions in the spaces provided by transverse openings 33 and 34. The female member of the connector is then fully assembled for application to a fuel line. The female member may be connected to a fuel line such as line 27 simply by inserting the reduced end section 26 in the fluid line in the conventional manner. If pressure is then applied to fluid line 27, passage of such fluid through the female member will be prevented by the closed valve member being disposed in sealing relation with the housing member as shown in FIG. 4. The valve member is maintained in the closed position in sealing relationship with the housing member by means of spring 43 and further by the force applied by the fluid pressure.

When it is desired to connect the male member to the female member connected to the fluid line under pressure, the conduit member simply is inserted through the release member into enlarged section 32 of the housing member so that the annular flange portion thereof engages the retaining leg portions of the retainer member to deflect them radially outwardly and permit the annular flange portion to pass between the retaining leg portions into engagement with the annular section of the retainer member. The conduit member will then be in coupling relation with the housing member as shown in FIG. 5. As the conduit is inserted into the housing member and the annular flange portion deflects the retaining leg sections to assume the position as shown in FIG. 5, conduit leading end portion 56 will be received within and guided through bushings 37 and 38 to displace the valve member and place the leading end of the conduit into sealing engagement with the O-rings. The O-rings will thus form a fluid tight seal between the conduit and the housing member.

With the valve member displaced forwardly by the leading end of the conduit as shown in FIG. 5, fluid under pressure will flow through passageway 30, enlarged section 31 and valve cut out portions 44b, around cylindrical section 44 of the valve member and through cutout sections 45b of the valve member into fluid passageway 53 of the conduit member.

Whenever it is desired to disconnect the connector, the housing member may be grasped firmly in one hand and the release member is displaced forwardly with the fingers of the other hand so that the retaining leg portions will be cammed radially outwardly to permit the conduit member to be withdrawn from the housing member. With the retaining leg portions deflected radially outwardly, the annular flange portion of the conduit member is free to pass unobstructed past the retainer member to be withdrawn from the housing member. As the conduit is withdrawn, spring 43 functions to displace the valve member rearwardly into the closed position as shown in FIG. 4 to prevent any further flow of fluid through the housing member.

With the connector in the coupled condition as shown in FIG. 5 and fluid pressure being applied to fluid line 27, the force of the fluid acts on the conduit member tending to eject it from the housing member. The force applied to the conduit member is transferred through the annular flange of the conduit member, the retaining leg portions, the wing portions formed on the retaining leg portions and the tab portions formed on the rear ends of the wing portions engaging bearing surfaces 35, to the housing member. In this regard, it is to be noted that reverse bend portions 51 of the retainer leg sections are out of longitudinal alignment with any portion of the housing member so that none of the load applied to the retainer member is transmitted from the retainer member to the housing member through either of bend portions 51 which are subject to fatigue failure. All of the load transmitted through the retainer member is transferred to the housing member exclusively through the pad portions of the retainer member which engage transverse bearing surfaces 35 and provide greater bearing surfaces for a greater distribution of the load being transmitted.

It will be appreciated that the provision for transverse slots 33 and 34 in the housing member serves several purposes. It provides a plurality of bearing surfaces for the retainer pad portions for transmitting distributed load to the housing member, provides guide surfaces for the axial displacement of the release member, prevents the rotation of the release member tending to misalign the release member relative to the retainer member, provides travel limits for the axial displacement of the release member and also prevents the removal of the release member from the housing member.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A fluid connector comprising:
 a housing having a longitudinal opening therethrough, said housing having at least one transverse opening therethrough intersecting said longitudinal opening and providing at least one transversely disposed bearing surface;
 a conduit having a leading end portion insertable in said longitudinal housing opening in a coupling position, said conduit having a fluid passageway communicating with said longitudinal housing opening and an annular flange disposed within said longitudinal housing opening and spaced from said transverse bearing surface when said conduit leading end portion is in said coupling position;
 means providing a seal between said housing and said conduit when said conduit leading end portion is in said coupling position;
 means disposed in said longitudinal housing opening for releasably retaining said conduit leading end portion in said coupling position, said retaining means including at least one leg section having a transversely deflectable retaining leg portion disposed between said conduit annular flange and said housing, said retaining leg portion having a pad portion engageable with said transverse bearing surface whereby upon application of fluid pressure to said connector tending to eject said conduit from its coupling position in said housing, the force exerted thereby is caused to be transmitted through said conduit annular flange, said retaining leg portion and the pad portion thereof engaging said transverse bearing surface to said housing; and
 means for selectively deflecting said retainer leg portion transversely to permit the removal of said conduit from said housing.

2. A fluid connector according to claim 1 wherein said transverse housing opening comprises a slot.

3. A fluid connector according to claim 1 including a pair of transverse openings in said housing disposed on opposite sides of a longitudinal axis of said housing and intersecting said longitudinal housing opening, providing a plurality of circumferentially spaced transverse bearings surfaces.

4. A fluid connector according to claim 3 wherein each of said transverse housing openings comprises a slot.

5. A fluid connector according to claim 1 wherein said retaining means includes an annular section which engages an annular interior wall of said longitudinal housing opening, is engaged by said conduit annular flange when said conduit leading end portion is in said coupling position and receives said conduit leading end portion therethrough, at least one leg section including a support leg portion extending rearwardly and outwardly from said annular section and said deflectable retaining leg portion forming a continuation of said support leg portion and extending forwardly and inwardly toward the opening of said annular section, and said retaining leg portion having at least one pad portion engaging said transverse bearing surface.

6. A fluid connector according to claim 5 wherein the adjoining ends of said support and retaining leg portions form a reverse bend portion which is disposed out of longitudinal alignment with any adjacent portion of said housing whereby upon application of fluid pressure to said connector tending to eject said conduit from its coupling position in said housing, no force exerted thereby shall be transmitted through said bend portion to said housing.

7. A fluid connector according to claim 6 wherein said longitudinal housing opening has an end section provided with a substantially oblong cross-sectional configuration, said housing is provided with a pair of transverse openings therein disposed on opposite sides of a longitudinal axis of said housing and intersecting said end section of said longitudinal housing opening to provide circumferentially spaced, transversely disposed bearing surfaces on said housing, said retaining means includes two legs providing pad portions engaging said transverse bearing surfaces and said reverse bend portions between said support and retaining leg portions are disposed out of longitudinal alignment with said housing.

8. A fluid connector according to claim 5 wherein said retaining leg portion includes at least one radially projecting wing portion and said pad portion is disposed on said wing portion.

9. A fluid connector according to claim 5 wherein said deflecting means comprises a release member disposed in said longitudinal housing opening for axial displacement therein, said release member having at least one cam surface engageable with a retaining leg portion of said retainer means for camming said retaining leg portion outwardly upon displacement of said release member axially inwardly relative to said housing for deflecting said retaining leg portion outwardly and releasing said conduit.

10. A fluid connector according to claim 9 wherein said release member includes a leading end portion engageable with said annular retainer section of said retaining means for limiting the axial forward displacement of said release member and correspondingly limiting the engagement of said cam surface with said retainer leg portion and the outward deflection thereof.

11. A fluid connector according to claim 9 wherein said release member includes means cooperable with at least one surface of said housing for guiding said release member axially.

12. A fluid connector according to claim wherein said sealing means comprises a pair of axially spaced bushings mounted on said housing within said longitudinal housing opening and adapted to receive said conduit leading end portion therethrough when in said coupling position and at least one 0-ring disposed between said bushings providing a seal between said housing and said conduit leading end portion.

13. A fluid connector according to claim 12 wherein said bushings are snap-fit into fixed relation with said housing.

14. A fluid connector according to claim 12 wherein said longitudinal housing opening is provided with a pair of axially spaced annular grooves and each of said bushing includes an annular projection portion adapted to snap into one of said grooves.

15. A fluid connector according to claim 12 including a pair of O-rings disposed between said bushings and separated by an annular spacer.

16. A fluid connector according to claim 12 wherein one of said bushings is engaged by said retaining means to restrict the forward displacement of said retaining means.

17. A fluid connector according to claim 1 wherein said housing is formed of a plastic material.

18. A fluid connector according to claim 1 wherein said housing is formed of a material that is highly heat and chemical resistant.

19. A fluid connector according to claim 1 wherein said housing is formed of polyphenol sulfide.

20. A fluid connector according to claim 1 wherein said retaining means is formed of stainless steel.

* * * * *

UNITED STATES PATENT AND TRADEMARK OFFICE
CERTIFICATE OF CORRECTION

PATENT NO. : 5,054,743
DATED : October 8, 1991
INVENTOR(S) : Phillip J. Norkey and David A. Bocson It is certified that error appears in the above-identified patent and that said Letters Patent is hereby corrected as shown below:

Column 9, line 28 after "claim" insert --1--.

Signed and Sealed this

Second Day of March, 1993

Attest:

STEPHEN G. KUNIN

Attesting Officer

Acting Commissioner of Patents and Trademarks